US United States Patent Office 3,343,258
Patented Sept. 26, 1967

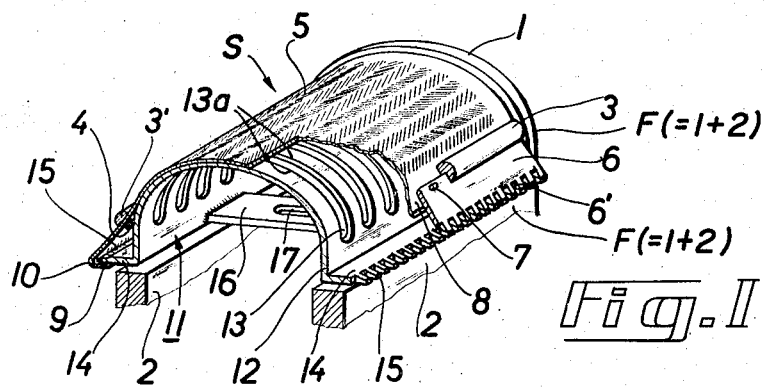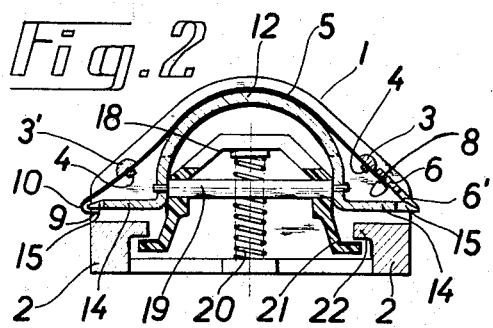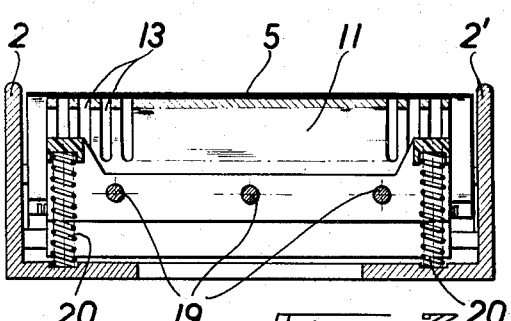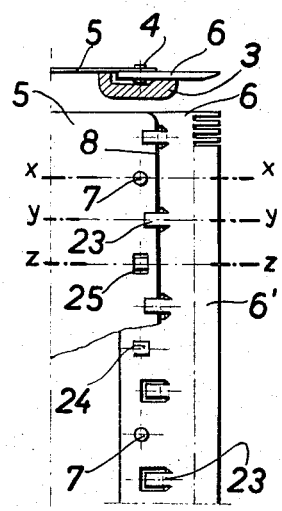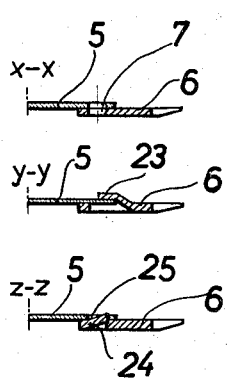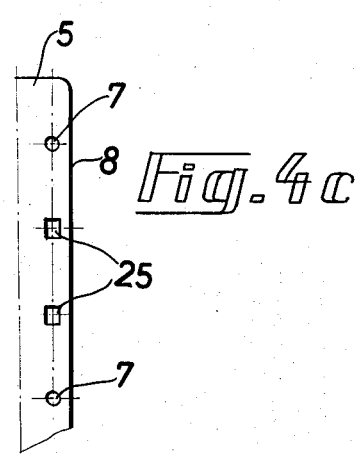

3,343,258
DRY SHAVER WITH ELASTICALLY DEFORMABLE CUTTER FOIL
Aldo Loner, Klagenfurt, Carinthia, Austria, assignor to Firma Carinthia Elektrogerate Gesellschaft m.b.H., Klagenfurt, Carinthia, Austria
Filed June 13, 1966, Ser. No. 556,960
Claims priority, application Austria, June 15, 1965, A 5,425/65
3 Claims. (Cl. 30—34.1)

ABSTRACT OF THE DISCLOSURE

A dry shaver with an elastically deformable cutter foil and a bar supported on one side of the shaver head and above the foil. A cutter is arranged under the foil and is movable to and fro in an axial direction and resiliently pressed against the foil.

---

This invention relates to a dry shaver with an elastically deformable cutter foil, which is supported at least on one side of the shaving head on a bar situated above the foil, and a cutter arranged under the foil and movable to and fro in an axial direction and resiliently pressed against the foil, there being a lateral row of cutting teeth on the cutter, cooperating with a row of cutting teeth projecting laterally beyond this bar.

In a known dry shaver of this kind, the row of cutting teeth projecting laterally beyond the bar is directly formed in the sheet metal of the cutter foil. In order to obtain a good shaving effect with a cutter foil, its thickness must be only very slight. This, however, has the result that a row of cutting teeth, which is directly formed out of an edge of a thin cutting foil projecting beyond the supporting bar, is very sensitive to damage and wear.

In accordance with the present invention the row of cutting teeth projecting laterally beyond the bar is formed on a separate plate, which acts as an extension of the edge portion of the cutter foil supported by the bar, and has greater rigidity than the cutter foil, the plate being in at least force-fitting connection with the edge of the cutter foil, so that the plate with its row of teeth is pressed, by the part of the elastically deformed cutter foil supported by the bar, against the lateral row of cutting teeth of the cutter.

In the construction according to the invention all the advantages are retained which arise from the fact that the elastic cutter foil at the same time also provides the cutting pressure for the side cutter. The cooperating parts of the device can be manufactured in the simplest manner without any need to observe narrow tolerances. Furthermore the parts are easily assembled, and in particular precision grinding is unnecessary, and yet perfect cutting, both by the cutter foil and by the side-cutter formed by the teeth, is ensured. In the arrangement according to the invention, the material of the plate carrying the row of cutting teeth can be chosen independently of the requirements which have to be made of the cutter foil. All the difficulties with regard to sensitivity or durability of the side cutter are thus eliminated.

The general idea of the present invention can be developed in many respects. In the simplest case the plate provided with the row of cutting teeth is connected undetachably, for instance by rivetting, spot-welding or the like, with the edge portion of the cutter foil supported on the bar and possibly projecting beyond it.

In a dry shaving device, in which the part of the cutter foil engaging the bar has apertures, as is known, in which projections, hooks or the like on the bar engage, in order to hold the cutter foil on the bar, the plate provided with the row of cutting teeth is with advantage provided with apertures which correspond to the apertures of the cutter foil, and then if the plate is arranged between the bar and the cutter foil, it is most simply loosely mounted. In this way an elastic clamping of the plate between the adjacent parts is obtained, by which the necessary cutting pressure for the side-cutter is generated.

Other features of the invention, particularly measures which are appropriate within the framework of the invention in order to facilitate the mounting in the head of the device of the cutter foil and of a plate carrying the cutting teeth, are explained with reference to the embodiments shown in the accompanying drawings. In these drawings:

FIGURE 1 shows in perspective and in partial cross-section a type of shaving head in which one longitudinal edge of the cutter foil is designed as a closed side-cutter, while the other longitudinal edge is in connection with a plate, of which the teeth form an open side-cutter with one row of teeth of the cutter.

FIGURE 2 represents a cross-section and FIGURE 3 a longitudinal section of a shaving head in accordance with the invention and showing a modified structure.

FIGURES 4a to 4c illustrate a detachable connection of a cutter foil with the plate having the cutting teeth and showing a further modified structure.

In the shaving head S of FIGURE 1, which is to be placed upon the housing of the dry shaver which contains the driving motor and forms the handle, there are end wall portions 1, which are connected into a frame F by longitudinal parts 2. On both lateral outer sides of the frame F, between the end wall portions 1 there are bars 3, 3' having peg- or hook-shaped projections 4 on their inside surface. The cutter foil 5 is mounted on the projections of both bars 3, and in addition a plate 6 is mounted on the projections 4 of the bar 3, in such a way that the plate 6 lies between the bar 3 and the mounted edge of the cutter foil 5. The cutter foil 5 and the plate 6 are provided with aligned apertures 7 for mounting on the projections 4. The mounted parts (cutter foil 5 and plate 6) are securely held on the projections 4 by the elasticity of the foil 5. The inner edge of the plate 6 is in this way elastically clamped between the bar 3 and the outer edge 8 of the foil 5.

The other longitudinal edge 9 of the foil 5 is bent at 10 in a manner known per se inwards around the edge portion 14 of the cutter 11. Short slots (not shown) are sawn in the edge so formed, so that the bars remaining between the slots can act as teeth of a closed side-cutter.

The cutter, designated as a whole as 11, is movable to and fro inside the curvature of the cutter foil 5. This cutter 11 consists of a metal sheet, of which the centre portion 12 is curved upwards approximately semi-cylindrically out of the plane of the metal sheet. The curved centre portion 12 is provided with a plurality of slots 13 running in the peripheral direction. The surface of this centre portion 12 is polished, so that the bars remaining between the slots 13 form cutting edges 13a cooperating with the cutter foil 5. The two edge portions 14 of the cutter 11, remaining in the original plane of the metal sheet, are provided on their respective outer edges with teeth 15 which form, with the toothed, angled-back edge portion 9 of the foil 5, a closed side-cutter, and with a row of teeth 6' on the plate 6, an open side-cutter. A sheet metal portion 16 provided with a slot 17, and forming a kind of chord of the curved centre portion 12, serves for driving of the cutter, which for example, is effected by means of a vibration motor. A dog of the driving motor engages in the slot 17 of this sheet metal part 16. The cutter is pressed into the curvature of the cutter foil by springs, which abut on the fixed part of the device. The springs are not shown in FIGURE 1, for the sake of clarity.

Details of another embodiment of the invention can be gathered from FIGURES 2 and 3, in which the head part of a dry shaver is shown in two sections perpendicular to each other. This head again has two end wall portions 1 connected by longitudinal parts 2, and between which bars 3 and 3' are arranged. The cutter 11 is again provided with slots in its centre portion 12 and with teeth 15 in its two side portions 14. The cutter is fixed on a plastic carrier member 18 by means of three bolts 19. The middle bolt of the three acts as drive through a fork (not shown), which is arranged at the end of the oscillating armature of a vibration motor and embraces the bolt. Two springs 20 press the carrier 18 upwards, and thereby press the cutter 11 into the curvature of the cutter foil 5. In order to limit the upward movement of the cutter, even when the cutter foil 5 is removed, overlapping strips 21 and 22 are provided on the carrier member 18 of the cutter and on the longitudinal parts 2 of the shaving head respectively. The cutter foil 5 and the plate 6 provided with the row of teeth are mounted on pegs 4 arranged on the bars 3 and 3'. On one of the longitudinal sides of the cutter foil 5, as already described in relation to FIGURE 1, a row of cutting teeth for a closed side-cutter is formed on an edge 10 formed by bending over the edge 9. The other edge portion of the cutter foil, which is supported on the bar 3 and whose edge 8 projects below the bar 3, is extended by a plate 6 which is permanently connected to the foil 5 by several spot welds. In this way the plate 6 effectively forms a rigid extension of the elastic cutter foil. The free edge of the plate is provided with teeth 6', which form an open side-cutter with the teeth 15 of the cutter 11.

The permanent connection between the cutter foil and the toothed plate is very convenient for handling when the cutter foil is being mounted in the shaving head and when it is being removed from the head. There is however the drawback that, on replacement of a defective cutter foil, the plate must also be changed unnecessarily with the foil. In this respect the loose mounting of the plate under the cutter foil, as is provided in the arrangement of FIGURE 1, is more advantageous. The mounting of two separated parts is however, more difficult. In FIGURES 4a to c there is shown a detachable connection of the cutter foil 5 and the plate 6, in which these disadvantages are avoided, but the advantages are combined. The foil 5 and the plate 6 have holes 7 corresponding to each other and to the projections 4 on the bar. On the plate 6, hooks 23 are provided on the surface turned away from the bar and thus facing the foil 5, which are directed away from the teeth of the plate 6, and extend so far above the surface of the plate that the foil 5 can be pushed with friction into the interstice below the hooks 23. The hooks are preferably punched out of the plate material of the plate 6 and bent. It is in itself a great simplification for the parts interconnected by friction, i.e. the foil 5 and the plate 6, to be mounted on the projections 4 of the bars 3, 3'. It is even more advantageous to secure the foil 5 in its position on the plate 6. For this purpose small abutments 24 (FIGURES 4a and b) are pressed out of the plate 6 on that surface of the plate 6 which carries the hooks 23. The foil 5 is provided with fitting apertures 25 (FIGURE 4c) at the points corresponding to these abutments 24. If the edge 8 of the foil 5 is now pushed so far over the abutments 24 and under the hooks 25 that it strikes the hooks 23, then the foil 5, when released, engages by the apertures 25 on the abutments 24 owing to its elasticity, and together with the plate 6 forms a unit, which can easily be mounted, but also easily separated again. This does not depend on precise fitting between the abutments 24 and the apertures 25, because the position of the foil 5 and of the plate 6 after mounting in the shaving head is determined by the balance of forces arising from the action of the springs pressing the cutter against the foil, from the elasticity of the foil itself, from the friction of the foil on the supporting bars, and from the shaving pressure exerted in shaving when the cutting part of the foil is used.

The use of a separate toothed plate, forming an extension of the cutter foil, in order to form an open sidecutter is not limited by the way in which the foil is supported on the bars. It is also possible to achieve removability of the foil from the bars of the shaving-head frame, for example by causing lugs on the foil to co-operate with recesses in the bars. Finally, the cutter foil may also be permanently connected with the bars.

What I claim is:

1. A dry shaver comprising an elastically deformable cutter foil, a bar, said foil being supported at least on one side of the shaver head on the bar situated above the foil, a cutter arranged under the foil and movable to move to and fro in an axial direction and resiliently pressed against the foil, a separate plate, the cutter having a lateral row of cutting teeth thereon and cooperating with a row of cutting teeth projecting laterally beyond the bar and formed on the separate plate, which acts as an extension of the edge portion of the cutter foil supported by the bar and has greater rigidity than the cutter foil, the surface of the plate turned away from the bar, being provided with hooks directed away from the teeth, and the edge of the cutter foil being pushed into the interstice between the plate surface and the hooks, so that the plate with its row of teeth is pressed, by the part of the elastically deformed cutter foil supported by the bar, against the lateral row of teeth of the cutter.

2. A dry shaver according to claim 1, in which the part of the cutter foil resting on the bar has apertures, in which projections are provided on the bar engage, and the plate with the row of cutting teeth has apertures which correspond to the apertures of the cutter foil, and is arranged between the bar and the cutter foil.

3. A dry shaver according to claim 1, in which there are abutments on the plate, and apertures in the cutter foil corresponding with the abutments in size and position, and the cutter foil, forced under the hooks, is held by the edges of the apertures engaging on the abutments of the plate.

References Cited

UNITED STATES PATENTS

| 2,371,242 | 3/1945 | Jensen | 30—34.1 |
| 2,975,516 | 3/1961 | Heyek | 30—34.1 |
| 3,213,535 | 9/1965 | Heyek | 30—34.1 |
| 3,271,854 | 9/1966 | Starre | 30—34.1 |

WILLIAM FELDMAN, *Primary Examiner.*

MYRON C. KRUSE, *Examiner.*